RECORDING METHOD USING TRANSLATING HEAD AND STYLUS

Filed Jan. 11, 1952

Normal Trailing axis

Perpendicular Stylus

Tipped Stylus

INVENTORS.
HARRY A. WILLIAMS
JOHN H. SHERWOOD
SAMUEL A. OLIVA

BY Curtis, Morris & Safford
ATTORNEYS

United States Patent Office 2,819,089

Patented Jan. 7, 1958

2,819,089

RECORDING METHOD USING TRANSLATING HEAD AND STYLUS

Harry A. Williams, Philadelphia, Pa., and John H. Sherwood, Fairfield, and Samuel A. Oliva, Danbury, Conn., assignors to Dictaphone Corporation, Bridgeport, Conn., a corporation of New York Application January 11, 1952, Serial No. 266,028

7 Claims. (Cl. 274—46)

This invention relates to electro-mechanical translating devices for use in signal recording and reproducing systems, and more particularly to an arrangement for mounting recording styli on translating heads for use in such systems of the embossed record type.

In the following disclosure of the present invention the term "embossed recording" will be used to denote the production of a signal track by the swaging or flowing aside of the record material from a record groove, as distinguished from that type of recording which involves an actual cutting away of the record medium.

In this type of recording the desired signals are recorded upon the record medium by displacing the record material from the signal groove by swaging it to each side of the signal groove, thereby forming a bead on each side of the signal groove, i. e. a pair of what might be called "spoil banks" on either side thereof. In reproducing from this type of record, what is known as "blind tracking" frequently occurs. This means that the reproducing stylus, as it is placed on the record, falls into the "false" groove or "land" between two "spoil banks" of two adjacent signal grooves rather than into the actual signal groove itself. Because the stylus is unable to tell the difference between this "false" groove and the true signal groove, it continues to track therein. When this occurs an unintelligible combination of the signals in the adjacent grooves is reproduced because the bead on one side of the "land" represents the signal of one groove, while the bead on the other side of the land represents the signal of the adjacent groove.

In the past numerous attempts have been made to solve this problem but without success. The only usable solution prior to the present invention was to construct the sound recording and reproducing machines with such precision and with such exact feedscrews as to swage accurately spaced record grooves, and with such precise backspacing mechanisms, that "blind tracking" was reduced to an extent sufficient to produce usable machines. None of these proposals served to eliminate the "blind tracking" problem for all practical purposes.

According to the present invention "blind tracking" is eliminated by mounting the recording stylus in an angular position in relation to the record to suppress the bead or "spoil bank" at one side of the signal groove and to emphasize the bead at the other side so that the reproducing stylus will at all times readily and quickly slide across the surface of the record into a true signal groove.

Accordingly it is a primary object of this invention to provide a recorder head and stylus arrangement that will eliminate "blind tracking."

It is another object to provide such a recorder head and stylus arrangement that is simple and easy to manufacture.

It is a further object of this invention to provide such a recorder head and stylus arrangement that will eliminate "blind tracking" without significant sacrifice of fidelity of recording.

These and other and further objects will be in part apparent and in part pointed out as the specification proceeds.

The invention accordingly consists in the features of construction, combinations of elements, methods of operation and arrangements, as will be exemplified in the following detailed description of a specific illustrative embodiment and from the accompanying drawings in which.

The present invention will be described as embodied in a recording head and stylus for embossed recording upon an endless belt record of extruded plastic, e. g. cellulose acetate butyrate, but it should be understood that the invention is not limited thereto but is equally applicable to other records of other shapes, e. g. discs, sheets, and the like, and to other record materials, e. g. comparatively soft pliable materials such as wax, or one of the thermoplastic compounds, particularly ethyl cellulose, cellulose acetate butyrate, cellulose nitrate and several of the vinyl compounds.

Figure 1:
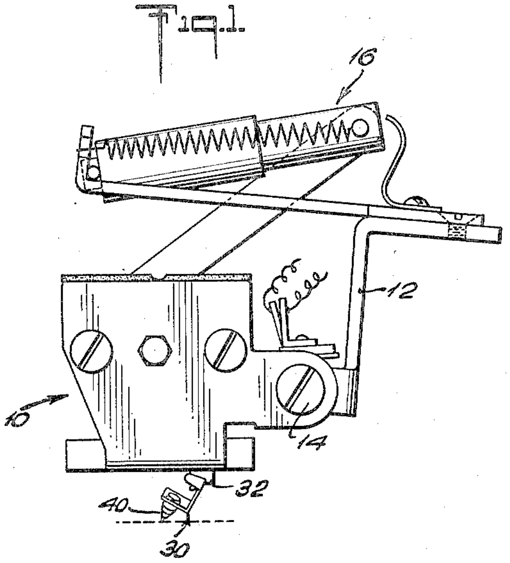
Figure 1 is a side elevation of a recording head assembly according to the present invention.

Referring now to Figure 1 a recorder head, generally indicated at 10, is mounted on a bracket 12 by pivot screws 14. The recorder head is also connected to the bracket 12 through a dash pot assembly, generally indicated at 16, which is arranged to limit and control the movement of the head in relation to the bracket.

Figure 2:
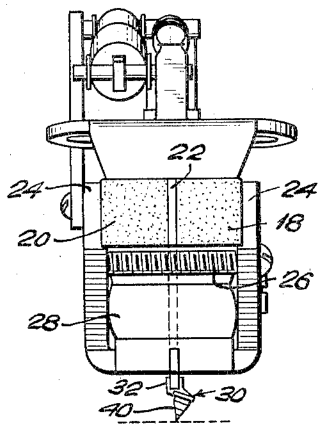
Figure 2 is an end view of the recording head assembly of Figure 1 taken from the left side of Figure 1.

The recorder head itself, as may be seen from Figure 2, comprises a pair of permanent magnets 18 and 20 mounted on either side of an armature 22, the free end of which terminates in a stylus assembly generally indicated at 30. The whole assembly is bolted together between pole pieces 24 by bolts 26. Also positioned between the pole pieces 24 is an energizing coil 28 which surrounds the armature 22 near its lower portion. For more specific details of the construction of a recorder head of this type, reference is made to the copending application of F. W. Roberts, Ser. No. 5,646, filed January 31, 1948. It may be noted that the present invention is well adapted for incorporation in such a recording head.

Figure 3:
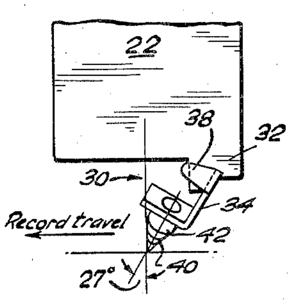
Figure 3 is a fragmentary side view of the armature and stylus structure of the recording head assembly of Figure 1.

Referring now to Figure 3 the stylus assembly generally indicated at 30 comprises a bracket 34 mounted on a projection 32 of the armature 22. A pair of ears 38 are provided at the upper end of bracket 34 to give added support thereto and both the bracket and ears may be soldered or brazed to the projection 32 to securely fasten the stylus assembly to the armature. The lower end of bracket 34 is partially turned back on itself to form a base on which to mount the stylus in a properly oriented manner in accordance with the invention.

The stylus of the illustrative embodiment comprises a conical jewel 40 mounted in a jewel holder 42 which is brazed to the free end of bracket 34. The stylus and bracket are arranged on the projection 32 to present the stylus to the record material at an angle of presentation of 27°, this angle being measured in the plane of the armature from the axis of the stylus to the longitudinal axis of the armature.

Referring now to Figure 5A, the perpendicular stylus representation, it is seen how beads 44 and 46 are formed on each side of the signal groove 48. As these beads are formed on each side of each signal groove there appears in effect a third groove between adjacent signal grooves formed by the land 50 and the adjacent beads 46 and 54. Consequently, on reproduction, if the stylus should happen to fall in the land between spoil banks 46 and 54, being unable to distinguish the difference between that and signal groove 48, it would follow this false groove and reproduce an unintelligible combination of the signals in the adjacent two grooves 48 and 52.

Figure 5:
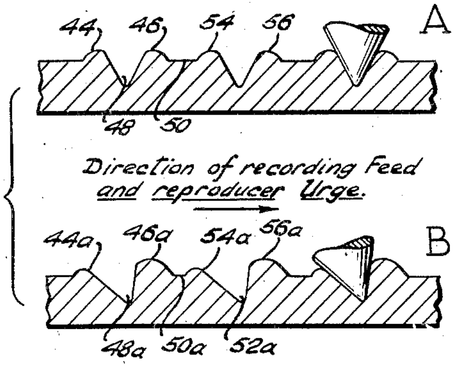
Figure 5 is an enlarged diagrammatic representation of the cross-section of the surface of a recording medium showing the type of embossed record grooves obtained with the present invention as contrasted with the type of embossed record grooves obtained heretofore.

In Figure 5B is shown a cross-section of the record obtained when the stylus is oriented according to the present invention. Here the stylus is tipped from the vertical in a plane perpendicular to the plane of the armature 22, at an angle to be described in detail herein, so that the left hand beads **44*a* and 54*a* are substantially eliminated, while the right hand beads 46*a* and 56*a* are substantially increased. This is due to the fact that the stylus in the tipped position pushes or flows most of the material from the record groove to the one side only. Thus it is seen by the suppression of one of the beads, the land 50*a* no longer forms a groove that is indistinguishable from the record groove as far as the reproducer stylus is concerned. In the reproducing apparatus, the head and stylus is biased or urged in the direction of the arrow in Figure 5 by means to be described herein, so that the reproducer stylus will move quickly over land 50*a* and spoil bank 54*a* until it falls into a record groove 52*a*, where it is stopped by the signal groove itself and the enlarged spoil bank 56*a***. The bias is made sufficient to overcome the suppressed spoil bank at the left but not the enlarged right hand spoil bank.

Figure 4:
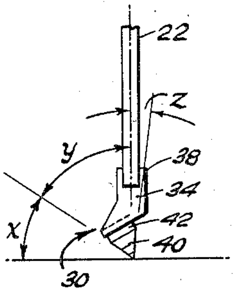
Figure 4 is a fragmentary end view of the armature and stylus structure of Figure 3 taken from the right side of Figure 3.

Referring now to Figure 4, it is seen that the tipping of the stylus to suppress one of the spoil banks is in a plane perpendicular to a vertical plane passing through the signal groove, i. e. the plane of the armature in the embodiment shown. It should be noted that this tipping is in addition to the tipping for the angle of presentation mentioned above in connection with Figure 3.

While the ideal situation would be a groove in which there was no spoil bank on one side and a comparatively high spoil bank on the other, the various factors entering into the tipping angle make it desirable to only closely approach this ideal. The tipping angle is determined by the degree of suppression required, the spacing of the grooves, the characteristics of the material in which the grooves are made, the stylus tip radius, the pressure on the stylus and the angle of presentation of the stylus with respect to the record material.

In a particular embodiment using a record material of extruded cellulose acetate butyrate, a groove spacing of 200 lines per inch, a stylus tip radius of 1.6 mils, a stylus pressure of 2¾ ounces, and an angle of presentation of 27°, it was found that the tipping angle must be held to within 47° to 50° from the horizontal. This angle X (Figure 4) is measured from the left-hand side of the stylus to the plane of the record material. In this embodiment, the included angle Y of the stylus itself was held between 48° to 50°, thus making the right-hand side angle Z (Figure 4) of the stylus vary from 5° to 10° from a line perpendicular to the record material.

Figure 6:
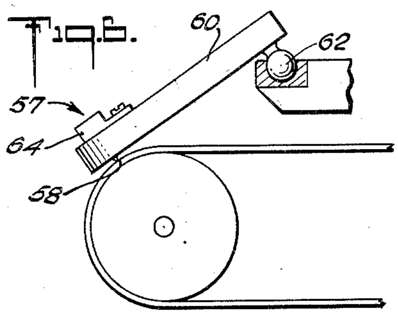
Figure 6 is a fragmentary side elevation of a reproducer stylus assembly according to the present invention.
Figure 7:
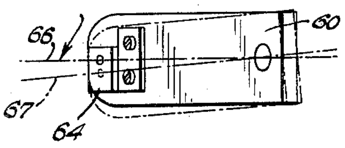
Figure 7 is a top plan view of the structure of Figure 6 with the belt and pivot support structure omitted.

Referring now to Figures 6 and 7, there is shown a reproducing stylus assembly generally indicated at 57. The reproducer stylus 58 comprises a conical jewel in a jewel holder similar to the recorder stylus assembly but not tipped. The reproducer stylus is mounted on the central axis of an arm 60 which is pivoted at a universal ball pivot 62, which in turn is mounted on the reproducer frame above the record so that the arm 60 hangs downward at an angle of approximately 35°. This mounting permits both an up and down and a lateral motion of the stylus. The pivot 62 is surrounded by a material such as silicone which is viscous and produces a high degree of friction to rapid motion so that once the stylus assembly is placed in a given position, it tends to stay there. The reproducer stylus assembly is fed by the usual feed screw across the record at the same rate that the grooves were made by the recording stylus assembly of Figures 1 through 4 so that the reproducer stylus tends to maintain the given relationship with the groove during the complete travel across the record.

As pointed out above, according to the present invention the reproducer stylus is biased or urged in a direction from the suppressed bead toward the exaggerated bead (from bottom to top in Figure 7). To insure this action there is provided, according to the present invention, an offset weight 64 adjustably mounted on the stylus arm 60 adjacent the stylus 58. This offset weight shifts the center of mass of the arm 60 in the direction from the exaggerated bead toward the suppressed bead so that the center of mass axis is shifted from the normal trailing axis and record groove 66, to the line indicated at 67.

Normally when an object is trailed behind a pivot point, its center of mass tends to seek a normal central trailing axis, which in this case, practically speaking, coincides with the record groove 66. In the normal symmetrical stylus assembly the center of mass and the center of the stylus coincide so that the arm trails in the record groove without any tendency to move out of either side. Thus without the offset weight, the arm 60 would tend to track, as shown in full lines in Figure 7, along the normal trailing axis and record groove 66. However, when the arm is not symmetrical so that the center of mass is displaced (axis 67, Figure 7) the arm, as it is trailed behind the pivot point 62, tries to align its center of mass with the normal trailing axis and record groove 66. This action is aided by the downward sloping of the arm 60 and the effect of gravity tending to make the axis 67 through the center of mass coincide with the normal trailing axis and record groove 66.

As the stylus is mounted along the geometrical central axis of the stylus arm, there is thus provided a bias or urging of the stylus arm 60 from bottom to top in Figure 7 which causes the stylus to slide quickly across the surface of the record over the suppressed bead until stopped by the exaggerated bead and groove.

There is thus provided a simple yet positive bias to ensure the prompt positioning of the stylus in a groove. This is in addition to any inherent tendency of the reproducer stylus assembly to move from bottom to top (Figure 7) such as would be encountered when the stylus arm is placed down on the record several grooves behind or below (as shown in Figure 7 in dotted lines), the normal signal groove directly beneath the stylus.

While there is given above a certain specific example of this invention and its application in practical use, it should be understood that it is not intended to be exhaustive nor to be limiting of the invention. On the contrary, this illustration and the explanation herein is given in order to acquaint others skilled in the art with this invention and the principles thereof and a suitable manner of its application in practical use, so that others skilled in the art may be enabled to modify the invention and adopt it and apply it in numerous forms, each as may be best suited to the requirement of a particular use.

We claim:

1. The method of making a sound recording by means of an embossing stylus having a groove-forming portion, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, holding said stylus in such a manner that predominantly more of said material is flowed to one of said stylus sides than to the other of said sides and so that one of said spoil banks rises to a substantially higher level than the other spoil bank, and vibrating said stylus in accordance with sound signals to be recorded on said record blank.

2. The method of making a sound recording by means of a substantially conical embossing stylus having a groove-forming portion including a rounded end tip, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, holding said stylus with the longitudinal axis thereof lying at an angle with respect to the surface of said record portion and such that a projection of said axis on said record surface has a component that is lateral to said direction of record movement, so that predominantly more of said material is flowed to one of said stylus sides than to the other of said sides and so that one of said spoil banks rises to a substantially higher level than the other spoil bank, and vibrating said stylus in accordance with sound signals to be recorded on said record blanks.

3. The method of making a sound recording by means of a tapered embossing stylus having a groove-forming portion, which comprises the steps of moving a record blank by and in contact with said groove-forming portion, pressing said stylus against said moving record blank to force the record material down and from beneath said groove-forming surface in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, holding said stylus with its longitudinal axis tipped such that one of said stylus sides is inclined at a substantially smaller angle with respect to the record blank surface at the region of contact than the other of said stylus sides, so that predominantly more of said material is flowed to one of said stylus sides and so that one of said spoil banks rises to a substantially higher level than the other spoil bank, and vibrating said stylus in accordance with sound signals to be recorded on said record blank.

4. The method of making a sound recording by means of a tapered embossing stylus having a groove-forming portion, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, the taper of said stylus being such that the included angle between said sides is approximately one-half of a right angle, holding said stylus with one of said stylus sides inclined with respect to the record blank surface in the region of contact at an angle that is approximately one half of a right angle and the other of said stylus sides inclined approximately at a right angle with respect to said record blank surface, so that predominantly more of said material is flowed to one of said stylus sides than to the other of said sides and so that one of said spoil banks rises to a substantially higher level than the other spoil bank, and vibrating said stylus in accordance with sound signals to be recorded on said record blank.

5. The method of making a sound recording by means of a tapered embossing stylus having a groove-forming portion, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, the taper of said stylus being such that the included angle between said sides is substantially less than a right angle, holding said stylus with one of said stylus sides inclined with respect to the record blank surface in the region of contact at an angle in the range of approximately 47 to 50 degrees and the other of said sides inclined with respect to said record blank surface at a substantially larger angle, so that predominantly more of said material is flowed to one of said stylus sides than to the other of said sides and so that one of said spoil banks rises to a substantially higher level than the other spoil bank, and vibrating said stylus in accordance with sound signals to be recorded on said record blank.

6. The method of making a sound recording by means of a substantially conical embossing stylus having a groove-forming portion including a rounded end tip, said stylus being mounted on the free end of a longitudinally-extended armature forming part of a recording head and with said tip approximately in line with the longitudinal axis of said armature, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, holding said stylus on the end of said armature in such a manner that the stylus longitudinal axis lies at an angle with respect to the surface of said record portion and such that a projection of said axis on said record surface has a component that is lateral to said direction of record movement, so that predominantly more of said material is flowed to one of said stylus sides than to the other of said sides and so that one of said spoil banks rises to a substantially higher level than the other spoil bank, and vibrating said stylus in accordance with sound signals to be recorded on said record blank.

7. The method of making a sound recording by means of an embossing stylus having a groove-forming portion, which comprises the steps of moving a record blank by and in contact with said groove-forming portion, pressing said stylus against said moving record blank to force the record material down and from beneath said groove-forming portion in a flowing movement laterally and upwardly along the sides of the groove-forming portion of said stylus that are oppositely located intermediate the leading and trailing surfaces of said groove-forming portion so as to swage a groove in said record blank having spoil banks along both edges thereof, holding said stylus with said oppositely located sides of said groove-forming portion positioned asymmetrically with respect to the surface of the record in contact with said stylus so that predominantly more of said material is flowed to one of said stylus sides than to the other of said sides and so that one of said spoil banks rises to a substantially higher level than the other spoil bank, and vibrating said stylus in accordance with sound signals to be recorded on said record blank.

References Cited in the file of this patent

UNITED STATES PATENTS

| | | |
|---|---|---|
| 919,856 | Haile | Apr. 27, 1909 |
| 941,010 | Cheney | Nov. 23, 1909 |
| 1,345,756 | Emerson | July 6, 1920 |
| 2,083,815 | Bender | June 15, 1937 |
| 2,347,623 | Wagner | Apr. 25, 1944 |
| 2,514,379 | Douglass | July 11, 1950 |
| 2,525,968 | Somers | Oct. 17, 1950 |
| 2,581,765 | Mann | Jan. 8, 1952 |